United States Patent [15] 3,660,775

Nechay [45] May 2, 1972

[54] TRAPEZOIDAL WAVE GENERATOR

[72] Inventor: Andrzej Nechay, Warsaw, Poland

[73] Assignee: Polska Akademia Nauk, Instytut Cybernetyki Stosowanej, Warszawa, Poland

[22] Filed: May 6, 1970

[21] Appl. No.: 34,991

[30] Foreign Application Priority Data

May 8, 1969 Poland ........................P 133421

[52] U.S. Cl. ..........................331/57, 307/268, 328/61, 328/178, 328/179, 331/143, 331/153

[51] Int. Cl. ..........................H03k 4/00

[58] Field of Search ..........................331/57, 111, 143, 153; 328/59–61, 127, 178, 179; 307/268

[56] References Cited

UNITED STATES PATENTS

| | | | |
|---|---|---|---|
| 3,001,091 | 9/1961 | Kaiser et al. | 328/127 X |
| 3,402,353 | 9/1968 | Hubbs | 328/59 |

*Primary Examiner*—Roy Lake
*Assistant Examiner*—Siegfried H. Grimm
*Attorney*—Irvin A. Lavine

[57] ABSTRACT

Disclosed is a wave generator capable of generating trapezoidal wave shapes. The generator comprises two operational amplifiers which function as integrators. Each operational amplifier has two trigger circuits connected to its input and two discriminators connected to its output. The discriminators and the trigger circuits are interconnected by a series of feedback loops. The generator of the present invention is capable of operation on internal or external synchronization to generate trapezoidal pulses in a single circuit.

6 Claims, 5 Drawing Figures

TRAPEZOIDAL WAVE GENERATOR

The present invention relates generally to a wave generator, and in particular to a wave generator for producing any trapezoidal waveform including triangular, sawtooth shaped and rectangular waveforms.

There are generators that produce special waveforms like, for example, triangular, sawtooth shaped and rectangular ones. Among numerous designs one can also find generators based on some combination of digital and analog circuits. The main feature of such generators is that they contain integrators and amplitude discriminators joined by a feedback loop. These generators are useful for generating symmetrical waveforms of various shapes but trapezoidal waveforms cannot be generated thereby.

There are known circuit arrangements that transform pulses of any shape into trapezoidal shaped waveforms. Generally they represent circuits working on the principle of charging and discharging capacitors or bridge-type circuits. Nevertheless they produce pulses of high frequency and can find their application in the television systems. Such circuits are complicated and highly elaborate. There is known a method and a circuit arrangement for generating trapezoidal pulses. The method consists in correcting an irregular pulse in time with a series of driving pulses as by applying a blocking pulse and a delayed pulse in order to obtain a trapezoidal pulse with linear edges. The resulting pulse has the shape of a trapezium with parallel or nonparallel base line and top line as well as a possibility of adjusting its rise and fall time. The circuit arrangement embodying this method comprises an elaborate basing of electronic and mechanical elements. At the input, the circuit arrangement has a stage producing driving pulses to which stage a prepulse generator, a blocking pulse generator and also a delay circuit and a delayed pulse generator are connected. The pulses obtained by this method are applied to an adder circuit with limiter and then to an output amplifier through a differentiating circuit inclining the top line of the trapezium. The circuit arrangement contains also mechanical elements facilitating the adjustment or variation of the desired lengths of each individual section of the trapezoidal pulse.

In this circuit there is generated a trapezoidal pulse with linearly rising front edge and a horizontal top line, the length of which is limited by the time that is needed for the delayed pulse of negative polarity to reach its maximum value. At this moment of maximum value, discharging of the system begins and the falling back edge of the trapezium is obtained. This slope is of nonlinear character. Both pulses — the one close to the trapezium and the delayed one — are applied to the adder circuit where a trapezoidal pulse of negative polarity and having both slopes linear but with the horizontal top line shortened, as well as another useless irregularly shaped pulse, are produced. The useless pulse is cut off afterwards and the trapezoidal one of negative polarity reversed.

The next trapezoidal pulse occurs when the circuit receives another driving pulse. Although this circuit arrangement allows the generation of pulses with a duration in the range from some microseconds up to a few seconds, the possibility of adjusting the duration of individual waveform sections is limited by the imposed frequency of the internal pulses as well as by the period of the blocking pulse. The time from the moment when the rise of the pulse ends to the moment when its falling begins depends on the rise time, as their sum is defined by the delaying circuit. If the rise time of the trapezoidal pulse gets longer, the time of its staying at a defined level will get shorter. So the sum of both sections of the trapezoidal pulse can be only adjusted in some limited range, whereas the interval between two successive trapezoidal pulses is very difficult to adjust. To realize adjustment in this case one has to change the frequency of the driving, blocking and delayed pulses. Thus, in order to vary each section of the trapezoidal pulses, very complicated adjustments at numerous points of the network are necessary.

In order to avoid errors the described circuit arrangement comprises mechanical blocking systems which allow the correct parameters of the trapezoidal pulse to be present in the system. The results of such manipulations can only be seen as an example on the screen of an oscilloscope that can show how the required trapezium was obtained. The mechanical systems prevent improper adjustments which could cause incorrect durations of individual trapezium sections.

An object of the present invention is to provide a trapezoidal wave generator comprising analog and digital elements in a simple network, said elements having the capability of being adjusted independently to vary the durations of the individual sections of the trapezium, i.e. with mutually independent adjustments of its rise time, duration, fall time and the interval between successive pulses.

The trapezoidal wave generator which contains analog and digital elements and among them discriminators and integrating circuits, has the essential feature that each its operational amplifier that integrates and limits the course of the process to a steady level as well as defines the rise time, the duration of staying at the steady level and the falling time of the trapezoidal waveform, has two trigger circuits joined to its input and two discriminators to its output. Every trigger circuit has two outputs. The operational amplifiers together with their trigger circuits and discriminators form feedback loops.

The generator according to the invention does not require a driving pulse generator. Nevertheless there exists a possibility of driving it with external pulses. The principle of operation explained with more details by the example of a specific embodiment, does not require driving pulses as the arrangement is not of the type that transforms pulses into trapezoidal ones as it was the case in other known systems. This was achieved by means of applying the feedback loop. Similarly there is no necessity to apply blocking pulses. In accordance with the principle of operation of the generator according to the present invention the trapezoidal pulse is produced in only one circuit of the generator network, and is not a result of performing a series of operations in a number of circuits of the network. There exists no process of adding or clamping of any intermediary waveform before obtaining the pure trapezium with linear edges.

The operational amplifiers are used as integrating elements to achieve better linearity of the edges of the trapezium. The trigger circuits at the input of each amplifier produce rise and fall edges of the trapezium and thus the fall edge is not a result of adding.

The formation of every successive section of the trapezium in the network according to the invention is achieved after the preceding section is terminated. Thus, for this reason any change of the duration of any section of the trapezium does not influence the duration of other sections.

In the network according to the invention, applying of blocking pulses is unnecessary and there is also no need to apply any mechanical blocking. Thus, the system is fully electronic and permits the generation of trapezoidal pulses with independent adjustments of each section of the pulse, and of its duration from a few milliseconds up to several tens of seconds.

The trapezoidal wave generator according to the invention will now be explained in more detail referring to the drawings wherein.

The generator is composed of a supply circuit, operational amplifiers, trigger circuits and discriminators. Each operational amplifier $W_1$ and $W_2$ has its output joined to two signal discriminators $K_1W_1$ and $K_2W_1$ for the first operational amplifier $W_1$ and $K_1W_2$ and $K_2W_2$ for the second amplifier $W_2$ respectively. At the input of each amplifier there are two two-stage trigger circuits $P_1W_1$ and $P_2W_1$ for the amplifier $W_1$ and $P_1W_2$ and $P_2W_2$ for the amplifier $W_2$, respectively. The output voltages of the trigger circuits $P_1W_1$ and $P_1W_2$ are equal to 0 or −U, where −U is a fixed value. The output voltages of the $P_2W_1$ and $P_2W_2$ are equal to 0 and +U respectively. The operational amplifiers $W_1$ and $W_2$ together with their discriminators and trigger circuits joined to them form a feedback loop. The function of the operational amplifiers $W_1$ and $W_2$ is to integrate the waveform (to produce its rising and falling sections), to remember (i.e. to limit) the waveform at a steady level and to define the time of the staying i.e., duration, of the trapezoidal waveform. To make independent the rise and fall times, discriminators $K_1W_1$, $K_2W_1$, $K_1W_2$ and $K_2W_2$ were applied each having two outputs. As the result of this it is possible to make independent the adjustments of the successive sections of the trapezoidal waveform.

Figure 1:
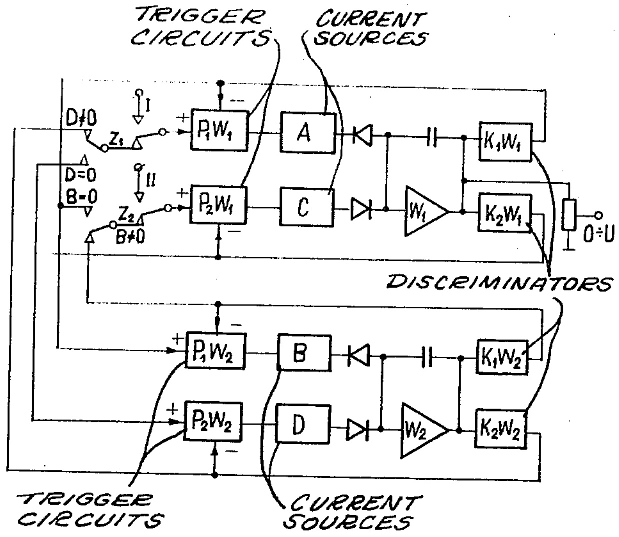
FIG. 1 shows the block diagram of a preferred embodiment.

In the diagram of FIG. 1 are four blocks A, B, C, D. These are sources of current loading the capacitor arranged in the branch of the feedback circuit of the operational amplifier. By means of these elements the time durations of separate sections of the trapezoidal waveform are varied, and consequently the rise time of the front edge A, or slope of the rising front edge A, the time duration of the section B corresponding with fixing the voltage at a determined level, the fall time of the back edge C, or the slope of the falling back edge C, and the time duration of the interval between successive pulses, or the time duration of the section D. Said elements are capable of being independently adjusted to vary the time durations of the individual sections of the pulse.

Figure 2:
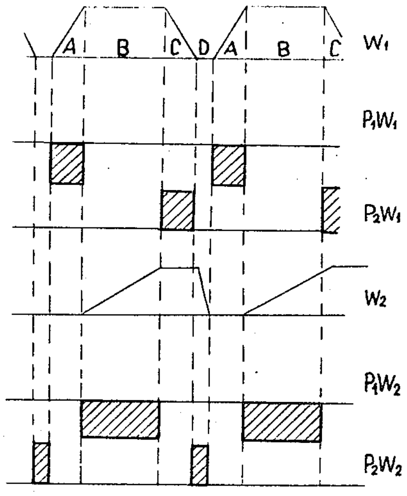
FIG. 2 illustrates a trapezoidal waveform obtained in different elements of the embodiment.

The work cycle of the generator will be explained on the basis of FIG. 2 on the drawing. The illustrated trapezoidal waveform obtained in the amplifier $W_1$ has four sections: the rising edge A, the section B on a steady level, the falling edge C and the section D at the steady zero level.

At the moment when at the input of the trigger circuit $P_1W_1$ occurs a voltage −U at the output of the amplifier $W_1$ begins a linear increase of the voltage with the rise or time constant being adjusted finely by means of the potentiometer not shown and adjusted roughly by the four-position switch. When the output voltage of the amplifier $W_1$ reaches the value $+U_1$ and so the increasing of the voltage will terminate, and the rising front edge A reaches its determined value, the discriminator $K_1W_1$ actuates and shuts the trigger circuit $P_1W_1$ and opens the trigger circuit $P_1W_2$. The value $+U_1$ of the voltage is not adjustable. Shutting the trigger circuit $P_1W_1$ causes staying of the output voltage of the amplifier $W_1$ at the level of $+U_1$. Opening the trigger circuit $P_1W_2$ causes the voltage increase at the output of the amplifier $W_2$ until it reaches the value $+U_2$, i.e. until termination of the time in which the voltage value gets fixed and the section B of the trapezium is obtained. When the output voltage of the amplifier $W_2$ reaches the value $+U_2$ (the value $+U_2$ of the voltage is not adjustable) the discriminator $K_1W_2$ starts, and thus the trigger circuit $P_1W_2$ is shut and the trigger circuit $P_2W_1$ opened. The values $+U_1$ and $+U_2$ are chosen close to the upper limit of the linear characteristics of the amplifiers $W_1$ and $W_2$. Shutting the trigger circuit $P_1W_2$ causes stopping of the increase of the output voltage of the amplifier $W_2$. Opening the trigger circuit $P_2W_1$ produces decreasing of the output voltage of the amplifier $W_1$ to zero and so the decreasing is terminated, and the falling back edge C reaches its determined value. The operation of the discriminator $K_2W_1$ causes shutting of the trigger circuit $P_2W_1$, stopping the output voltage of the amplifier $W_1$ at the zero level and opening the trigger circuit $P_2W_2$. The output voltage of the amplifier $W_2$ falls down to zero, and so the section D of the trapezoidal waveform, corresponding with the fixing of the voltage at zero level, is terminated. At this instant actuates the discriminator $K_2W_2$ and the trigger circuit $P_2W_2$ is shut and the trigger circuit $P_1W_1$ opened. The output voltage of the amplifier increases and the section A begins again. The working cycle repeats.

In the generator according to the invention there exists the possibility of adjusting the slopes of the edges A and C by means of the choice of the network parameters. Furthermore, by making appropriate connections in the network of the generator, it is possible to diminish the time duration of sections B or D, or both of them simultaneously to zero and thus to change the shape of the waveform generated. The changings can be made respectively by means of the switches $Z_1$ and $Z_2$shown in FIG. 1. The choice of the connection direction of the switches depends on whether there exists a need to reduce to zero the top line of the trapezium, i.e. the section B, or the interval between successive pulses, i.e. the section D. In the drawing said directions are marked with symbols at the switch $Z_1$: D =0 and D ≠ 0, and at the switch $Z_2$: B =0 and B ≠ 0.

The working cycles described above occur with internal synchronization. The circuit arrangement also operates with external synchronization.

Figure 3:
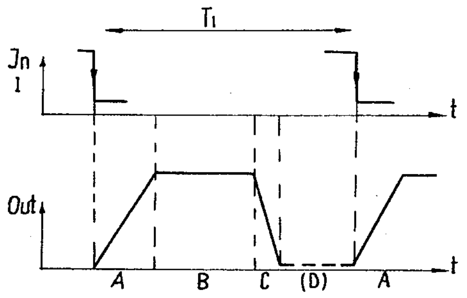
FIG. 3 illustrates a trapezoidal waveform obtained with operation of the generator with an external pulse releasing the rising front edge.

When using an external pulse to release the rising front edge A of the trapezium, the releasing pulse from the external source is fed to the terminal I. In this case an external adjustment of the length of the trapezium front edge A is achieved, and consequently the reduction of the section D. The start of the voltage rise, and so the start of the rise of the front edge A, occurs at the instant there appears at this terminal a pulse with negative slope. Producing of the sections A, B and C then proceeds in the same manner as working with internal synchronization. A repeated increase of the output voltage of the amplifier $W_1$, i.e. the start of the rising front edge A, begins at the moment when the next negative external releasing pulse appears at the terminal I. The repetition period of the pulses at the terminal I has to be longer than the sum of the time durations of the rising front edge A, the section B, and the falling back edge C. The time duration of the section D of the trapezoidal waveform, corresponding to the zero level, is the difference between the period of pulses coming from an external source and the sum of time durations of remaining sections of the trapezium. This is illustrated in FIG. 3, where $T_1$ is the period of pulses from an external source. In said figures the curve plotted in coordinates $We_I$, $t$, represents the elements of the external releasing pulse, the diagram with coordinates $U_{wy}$, $t$, representing the obtained output pulse of trapezoidal form.

Figure 5:
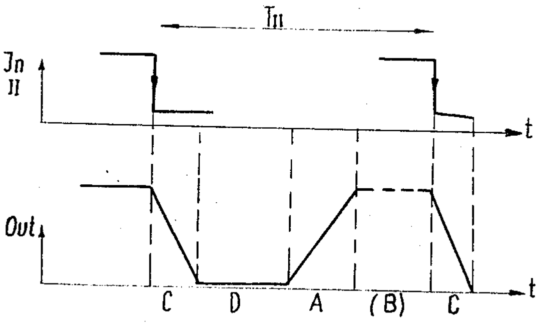
FIG. 5 illustrates the trapezoidal waveform obtained with external pulse releasing the falling back edge.

While working with the internal pulse releasing the falling back edge of the trapezium C, the releasing pulse from an internal source is applied to the terminal II. In this case there is achieved an external adjustment of the length of the falling back edge C of the trapezium, and so the possibility of varying the length of the section B of the trapezium. At the instant of appearing of a pulse from an external source at the terminal II, the output voltage of the amplifier $W_1$, kept hitherto at the level $U_1$, begins to fall, the falling back edge C or the trapezium being released. Further, according to the cycle determined by the operation of the generator, the section D of the trapezium and the rising front edge A are generated successively. The time duration of the section B, corresponding to the fixing of the voltage at a determined level, is the difference between the period of pulses from an external source and the sum of time durations of the remaining sections of the trapezium. This is illustrated in FIG. 5, where $T_{II}$ is the period of pulses from an external source. In this figure, the curve plotted against the coordinates $We_{II}$, $t$, represents the elements of the external pulses, and that plotted in coordinates $U_{wy}$, $t$, represent the obtained output pulse of trapezoidal form.

Figure 4:
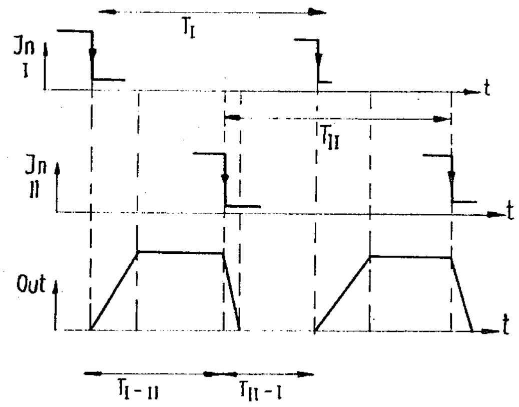
FIG. 4 illustrates the trapezoidal waveform obtained with external pulses releasing the rising front edge and the falling back edge.

The arrangement according to the invention is also provided to operate with external pulses releasing the rising front edge A and the falling back edge C. Then, owing to the simultaneous regulation of the edges A and C, simultaneous but independent adjustments of time durations of the sections B and D is achieved. On the terminals I and II external releasing pulses are applied, having their periods $T_I$ and $T_{II}$ respectively. The operation is the same as described above, but is simultaneous. Consequently, a trapezoidal pulse is obtained, in which — through varying the time durations of the edges A and C — the adjustments of sections B and D are obtainable, that is, of the trapezium top line of the interval between successive pulses. These interdependences are shown in FIG. 4. The curve plotted against the coordinates $We_{II}$, $t$, represents the elements of the external pulse releasing the rising front edge A, however that plotted in coordinates $We_{II}$, $t$, represents the elements of the external pulse releasing the falling back edge C, and that plotted in coordinates $U_{wy}$, $t$, represents the output pulse of trapezoidal shape. As shown in the drawing, the top line of the trapezium, and so the time duration of the section B, is the difference between the time passing from the moment of entry of the pulse releasing the rising front edge A into the arrangement to the moment of entry of the pulse releasing the falling back edge C into the arrangement — conventionally designed $T_{I-II}$ — and the time duration of the front edge A. The interval between successive pulses, that is the time duration of the section D, corresponding to the zero level is the difference between the time passing from the moment of entry of the pulse releasing the falling back edge C into the arrangement to the moment of entry of the pulse releasing the rising front edge A into the arrangement — conventionally designed $T_{II-I}$ — and the time duration of the back edge C.

In consequence of operation with internal releasing, the generator herein described permits the obtaining of not only a waveform with different time durations of individual sections of the waveform, but also a waveform shaped as a scalene triangle, an equilateral triangle, or an isosceles triangle, repeated successively intermediately or after a predetermined time.

Moreover, the trapezoidal wave generator herein described may be applied to build generators of complex waveforms comprised of a larger number of sections. In order to introduce to the waveform any additional deflection, the number of operational amplifiers, trigger circuits and discriminators must be multiplied, and the connections between them must be accordingly changed.

What I claim is:

1. A trapezoidal wave generator comprising first operational amplifier means having an input and an output, and functioning to integrate a signal applied to said input; first and second trigger circuits connected to said first operational amplifier means input; first and second discriminators connected to said first operational amplifier means output; second operational amplifier means having an input and an output and functioning to integrate a signal applied to said input; third and fourth trigger circuits connected to said second operational amplifier means input; third and fourth discriminators connected to said second operational amplifier means output; and feedback circuits interconnecting said discriminators with said trigger circuits.

2. The trapezoidal wave generator of claim 1 further comprising switches connected to said first and second trigger circuits to enable driving said generator by an external pulse generator whereby said generator operates according to the application of external synchronization signal.

3. The trapezoidal generator of claim 1 wherein said feedback circuits comprise interconnecting said first discriminator with said first and third trigger circuits, said second discriminator with said second and fourth trigger circuits, and said third discriminator with said third and second trigger circuits, and said fourth discriminator with said fourth and first trigger circuits.

4. The trapezoidal wave generator of claim 1 wherein said operational amplifiers, differentiators and trigger circuits contain analog and digital circuits.

5. The trapezoidal wave generator of claim 1 wherein each said trigger circuit has two inputs.

6. The trapezoidal wave generator of claim 5 wherein said first trigger circuit has one input connected to said first discriminator and another input connected to said fourth discriminator.

* * * * *